Dec. 14, 1954  E. W. HOUGHTON  2,697,208
REFLECTIONLESS WAVE GUIDE TERMINATION
Filed Oct. 29, 1948
2 Sheets-Sheet 1
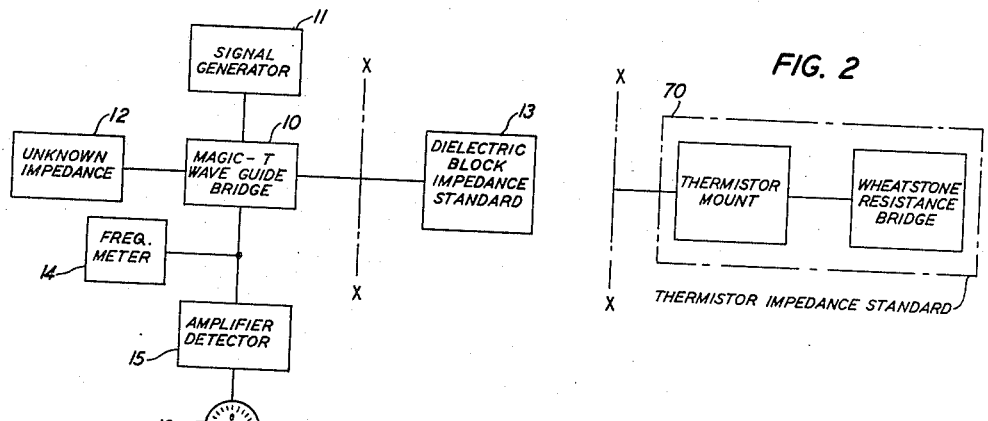
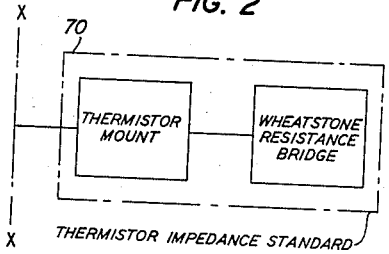
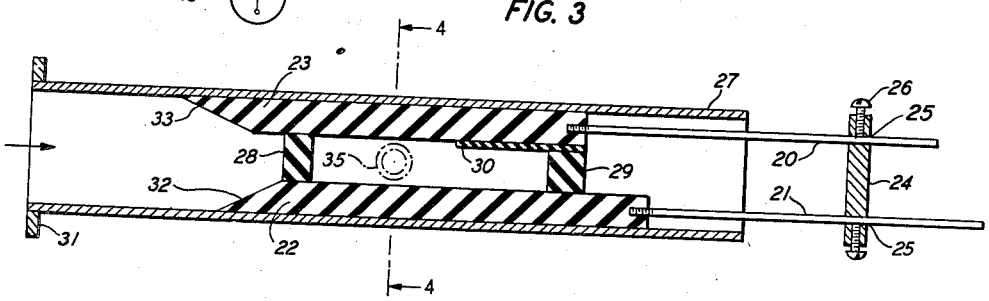
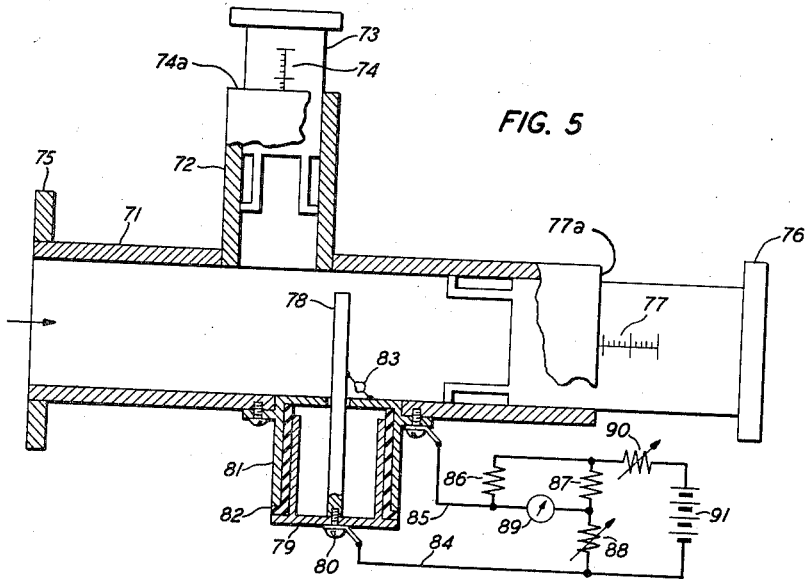
INVENTOR
E. W. HOUGHTON
BY
Patrick J. Roche
ATTORNEY

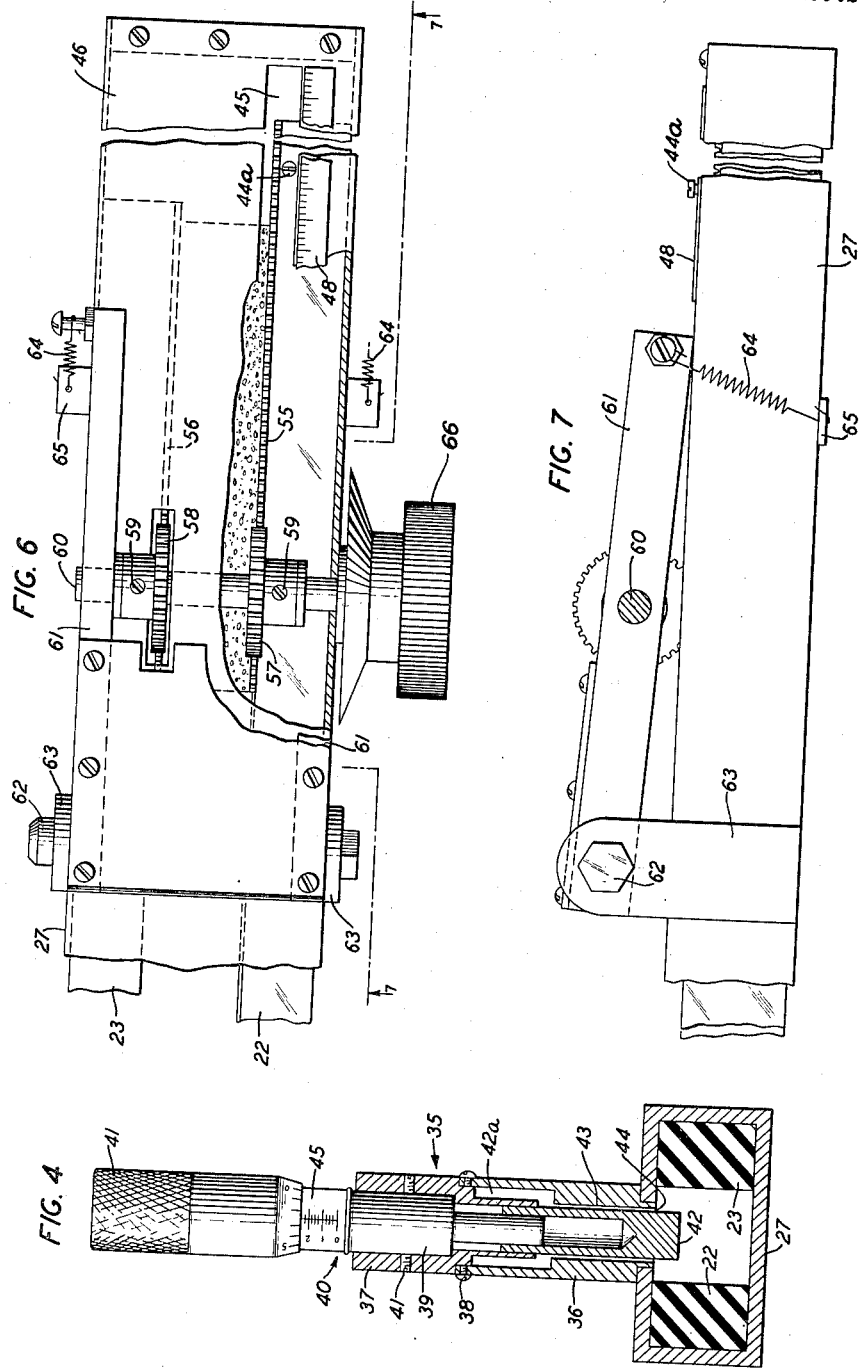

United States Patent Office 2,697,208
Patented Dec. 14, 1954

2,697,208

REFLECTIONLESS WAVE GUIDE TERMINATION

Edward W. Houghton, Chatham, N. J., assignor to Bell Telephone Laboratories, Incorporated, New York, N. Y., a corporation of New York Application October 29, 1948, Serial No. 57,390

11 Claims. (Cl. 333—33)

This invention relates to a measuring system including wave guide bridges, and more specifically to an impedance standard for use in such bridges.

It is well known that Wheatstone bridge systems have been employed for measuring impedance at RF frequencies and therebelow on a null basis. These systems have utilized impedance standards suitable for effecting measurements only in such frequency range.

The present invention contemplates an impedance standard suitable for measuring impedance at frequencies in the microwave range say, for example, microwaves whose wavelength is one meter or less.

The main object of the invention is to provide an impedance standard operable in the range of microwave frequencies.

Another object is to provide an impedance standard adapted for use in wave guide circuits.

A specific embodiment of the present invention, as used with a null type of bridge measuring system including a wave guide bridge, comprises a section of wave guide having one end adapted for connection to one branch of the bridge, a pair of elongated dielectric blocks spaced in a horizontal plane and movable longitudinally in the interior of the wave guide, tapered portions formed on adjacent ends of the dielectric blocks and disposed in staggered relation in the one end of the wave guide, a resistance termination affixed to the dielectric blocks rearward of the tapered portions, a calibrated probe insertable in different amounts into the interior of the wave guide between the spaced dielectric blocks and intermediate the tapered portions and the resistance termination, and means mounted at the opposite end of the wave guide for moving both dielectric blocks at the same time as well as moving each block with reference to the other block.

An alternate embodiment involves a thermal resistor mounted in a section of wave guide.

The invention will be readily understood from the following description when taken together with the accompanying drawings in which:

Fig. 1 is a schematic block diagram showing a wave guide bridge system for measuring impedance and including a specific embodiment of the invention;

Fig. 2 is a block diagram of an alternate embodiment of the invention that may be substituted in Fig. 1;

Fig. 3 is a plan view of the specific embodiment of the invention usable in Fig. 1 and assembled in a section of wave guide with the top side of the latter removed;

Fig. 4 is an elevational view taken along the line 4—4 in Fig. 3;

Fig. 5 is a plan view, partially in section, of an alternate embodiment of the invention that may be substituted in Fig. 1;

Fig. 6 is a plan view of an alternate arrangement for moving the dielectric blocks in Fig. 3; and Fig. 7 is an elevational view taken along the line 7—7 in Fig. 6.

A balanced Wheatstone bridge system having a null detector for measuring an unknown impedance in terms of a calibrated impedance at RF frequencies and therebelow is well known. This system is readily adaptable for the type of impedance measurements at microwave frequency as shown in Fig. 9.15 and described on pages 530–536 of Technique of Microwave Measurements, Radiation Laboratories Series, Massachusetts Institute of Technology, 1947. The foregoing microwave system for measuring the reflective effect of a terminating impedance does not yield information which will allow the computation of resistive and reactive components of the impedance.

Fig. 1 shows the well-known Wheatstone bridge system adapted for measuring an unknown impedance at frequencies in the microwave range say, for example, waves whose wavelength is one meter or less in terms of a calibrated impedance standard. This microwave system comprises a wave guide bridge 10 of a type, for example, as a hybrid junction or a hybrid ring as disclosed in the patents of W. A. Tyrrell Nos. 2,445,895 and 2,445,896, both of which issued July 27, 1948, or similar multi-branch wave guide connecting system. This wave guide bridge has one branch connected to a suitable generator 11 of microwave signals, of the order of 4000 megacycles for this description, a second branch to unknown impedance 12, a third branch to an impedance standard 13, and a fourth branch to a frequency meter 14, an amplifier-detector 15 and zero-center meter 16 or oscilloscope in sequence. Each branch of such wave guide bridge is connected to its associated circuit components by sections of rectangular wave guide having standard dimensions. The microwave system according to Fig. 1 is adapted to transmit electromagnetic waves of the dominant or $TE_{0,1}$ mode, for the purpose of this description.

In accordance with the invention, the impedance standard 13 shown in Fig. 3 and transmitting electromagnetic waves of the dominant or $TE_{0,1}$ mode for this description includes a pair of brass rods 20 and 21 having corresponding ends extending through one end of a section of rectangular wave guide 27 and secured to the rectangular ends of a pair of elongated blocks 22 and 23 of dielectric material preferably of polystyrene and spaced along a wide side of wave guide 27 in a horizontal plane by a pair of dielectric spacers 28 and 29 preferably of polystyrene foam. The blocks 22 and 23 at their opposite ends are formed with integral tapered portions 32 and 33, respectively, in a vertical plane; and are so positioned in the interior of the wide side of wave guide 27 that the tapered portions are disposed substantially in opposing relation along the longitudinal axis of wave guide 27. In this connection it will be understood that the tapered portions may be formed in different planes or assume the form of a recess or a rectangular projection or other special shape to minimize wave reflection as mentioned later herein. Furthermore, it will be understood that the tapered portions 32 and 33 may be disposed in back-to-back relation and the other formations on adjacent ends of the polystyrene blocks may be so mutually disposed as to minimize wave reflection.

A brass rod 24 constituting a finger grip contains two spaced transverse holes 25, 25 for accommodating and spacing the rods 20 and 21. Set screws 26, 26 lock the finger grip 24 on the brass rods 20 and 21 to maintain the tapered ends 32 and 33 in a predetermined relation, i. e., staggered or stepped in a horizontal plane for a purpose that will be mentioned later; and permit each polystyrene block 22 or 23 to be moved longitudinally of wave guide 27 relative to the other to achieve such predetermined relation. The finger grip 24 with the set screws 26, 26 fixed on the brass rods 20 and 21 enables simultaneous sliding movements of the polystyrene blocks 22 and 23 longitudinally of the interior of a wide side of wave guide 27 through one end thereof. The opposite end of wave guide 27 includes a flange 31 connectable to a branch of the wave guide bridge 10, Fig. 1.

A resistance card 30, Fig. 3, preferably of the graphite-coated type and tapered at the end disposed in the direction of the wave guide bridge 10 in Fig. 1 constitutes a termination for wave guide 27. It will be understood that the tapered end of resistance card 30 may be formed similarly to the ends of the polystyrene blocks 22 and 23 to minimize wave reflection as above explained. The two polystyrene blocks 22 and 23, spacers 28 and 29 and resistance card 30 are normally connected together as a unit movable under control of finger grip 24 as above mentioned.

A probe 35, Fig. 3, positioned on one wide side of the wave guide 27 intermediate the polystyrene blocks 22 and 23 is adapted for adjustable penetration into the interior thereof in a manner that will now be explained. Referring to Fig. 4 the adjustable probe 35 is a micrometer type and comprises a hollow cylinder 36 having its lowermost portion suitably attached to the upper wide side of wave guide 27. On the uppermost portion of the cylinder 36 is attached a tubular member 37 by a plurality of screws 38, 38 spaced peripherally on the cylinder 36. A lower portion 39 of a hollow cylinder mount 40 is fixedly secured interiorly of the tubular member 37 by a plurality of set screws 41, 41 spaced peripherally thereon. On the upper portion of the mount 40 is positioned a cap 41 adapted for vertically moving a plunger 42 varying amounts into and out of the interior of wave guide 27 between the polystyrene blocks 22 and 23. Thus, the tapered portions 32 and 33, the plunger 42 and the resistance card 30 in Fig. 3 are positioned in sequence in that order with reference to the flange 31 connectable to the wave guide bridge 10. Probe 35 is suitably calibrated at area 45 for indicating the depth of the penetration of the plunger 42 in the interior of the wave guide 27. A wave trap 42a of a quarter wavelength transforms a short circuit to high impedance; and a wave trap 43 of a quarter wavelength transforms the high impedance to a low impedance. The two wave traps 42 and 43 in tandem constitute a good electrical short circuit at area 44 whereby no electrical energy from the interior of wave guide 27 tends to escape into the interior of the probe 35.

The impedance standard 13 is initially aligned to provide minimum residual wave reflection when it is set for 1.00 VSWR (voltage standing wave ratio) calibration mentioned in detail hereinafter. The residual wave reflection should be made as low as possible to minimize its contribution to the error of measurements discussed below. The minimum residual wave reflection is achieved as follows: (1) utilizing a wave guide 27 of standard dimensions and a standard wave guide connector at its flange 31, at least at the input end of impedance standard 13; (2) tapering the resistance card 30 in the direction of the wave guide bridge 10 in Fig. 1 to provide such termination as to obtain the minimum residual wave reflection; (3) adjusting the relative positions of the polystyrene blocks 22 and 23 in the staggered relation to such predetermined extent as would tend to provide the minimum residual wave reflection; and (4) determining the setting of the probe 35 to obtain the minimum residual wave reflection.

As regards (1), the wave guide 27 is measured from a mechanical standpoint to ensure proper mechanical tolerances. As regards (2) the selection of the tapered design of the resistance card 30 is largely a matter of experience, and the performance of the resistance card 10 as a termination may be checked as indicated below with reference to (3).

In connection with (2) and (3), the polystyrene blocks 22 and 23 and the resistance card 30 are preferably placed in the interior of the wave guide 27 before the probe 35 is positioned thereon. The signal generator 11 and a calibrated section of slotted wave guide included in a standing wave indicator of familiar structure, not shown, may be used to check the residual wave reflection of the resistance card 30 while leaving the polystyrene blocks 22 and 23 stationary. The resistance card 30 is slid back and forth along the horizontal side of the stationary polystyrene block 23, for example, to create maxima and minima voltage points at a fixed position for the pick-up probe of the standing wave indicator just mentioned. Next the residual wave reflection for various staggered positions of the polystyrene blocks 22 and 23 can be measured by leaving the resistance card 30 fixed in position, for the moment, and moving the polystyrene blocks 22 and 23 together longitudinally of wave guide 27. This will enable the selection of the optimum relative setting of the polystyrene blocks 22 and 23 in the staggered relation.

Regarding (4), the probe 35 is then positioned on the top wide side of wave guide 27 and adjusted to obtain minimum change in the reading of the meter 16 as the polystyrene blocks 22 and 23 and the resistance card 30 are moved together through one-half wavelength with the unknown branch 12 short-circuited. This will provide the reference setting of the probe 35.

The impedance standard 13 may be calibrated in Fig. 1 as follows: the meter 16 is calibrated in decibels, and the unknown impedance 12 is replaced by a tunable termination of familiar structure, not shown. This termination is tuned to give zero reading on the meter 16 when the probe 35 is adjusted to its above-noted reference setting. Measurements of the wave reflection as the setting of probe 35 is adjusted will then constitute a calibration of the impedance standard 13. Since the residual wave reflection from the impedance standard 13 is balanced out in the detector branch of the wave guide bridge 10 by the tuning of the above-noted termination in the unknown branch 12, the resulting calibration is approximately a calibration of incremental wave reflection versus changes in the reading of probe 35 from its reference setting.

Alternately, the impedance standard 13 may also be calibrated in Fig. 1 as follows: The unknown impedance 12 is replaced by a thermal resistance load, not shown, including a thermal resistor mounted in a wave guide tunable to establish zero reading on the indicator 16. A thermal resistor is a resistance having a temperature coefficient of resistance. The polystyrene blocks 22 and 23 are positioned in staggered relation as above noted to provide a phase shift to the probe 35 such that changes of the wave reflection amplitude effected by varying the amount of penetration of the plunger 42 in the interior of the wave guide 27 can be balanced out in the indicator 16 by changing the direct current operating resistance of the thermistor, not shown, in the well-known manner. Ratios of these values of effective resistance to the initial balancing resistance of such thermistor establish the incremental VSWR calibration of the adjustable probe 35. The theory involved is that a generalized four-terminal network containing a single dissipative element initially provides a purely resistive impedance at its input; and as the radio frequency resistance of the dissipative element is changed, the standing wave ratio of the input impedance, with respect to its initial resistance, is exactly equal to the ratio of the radio frequency resistances of the dissipative element. It is known that the radio frequency resistance of certain thermal resistors is directly proportional to their direct current resistances. Therefore, the standing wave ratios were obtained by measuring the direct current resistance of thermal resistor. A thermal resistor circuit of one type adaptable for such calibration is disclosed in the patent of E. W. Houghton No. 2,415,823 issued February 18, 1947.

In the operation of Fig. 1, it will be understood initially that the impedance standard 13 is calibrated as above explained, the readings of the probe 35 being referred to a curve involving VSWR versus settings of the probe 35. The signal generator 11 is adjusted to the desired operating frequency which will be shown by the frequency meter 14. This may involve some adjustments of the gain and tuning of the amplifier-detector 15 to provide a reading on the indicator 16. Then, with the unknown impedance 12 and the impedance standard 13 connected in the circuit of Fig. 1, the dielectric blocks 22 and 23 and the probe 35 are adjusted until a zero reading is provided on the indicator 16. The reading of the probe 35 beyond its reference setting is referred to the chart to obtain directly the VSWR of the unknown impedance 12.

The probe 35 has its plunger 42 disposed substantially in an antinodal region of maximum field intensity of the electromagnetic waves being transmitted in wave guide 27 and sets up a wave reflection with an amplitude equal substantially to that set up by the unknown impedance 12. The polystyrene blocks 22 and 23 serve to shift the phase of the wave reflection set up by the probe 35 to balance the phase of the wave reflection due to the unknown impedance 12. The wave reflection at the probe 35 corresponds to that associated with a capacitance shunted across the characteristic resistance of the wave guide 27 provided by the tapered resistance card 30. The phase angle of the wave reflection in the impedance standard 13 is therefore substantially constant for wave reflection having small amplitudes, 45 degrees to 49 degrees for 1.00 to 1.20 VSWR. At the wave guide bridge 10, the phase angle of the wave reflection due to the impedance standard 13 is changed by twice the phase shift along the wave guide 27 extending between the wave guide bridge 10 and the probe 35. This phase shift is varied by changing the length of the polystrene blocks 22 and 23 in the section of wave guide 27 extending between the wave guide bridge 10 and the probe 35.

Thus, the polystyrene blocks 22 and 23 could be calibrated to obtain the amount of the phase shift introduced into the wave reflection in the impedance standard 13. In such event, the polystyrene blocks 22 and 23 could be provided with a reference setting, similarly to the reference setting of the probe 35, as indicated by the position of a screw 44a mounted on polystyrene block 22, Fig. 6, seen through a longitudinal slot 45 in cover 46, Fig. 6, and the amount of longitudinal movement of the polystyrene blocks 22 and 23 noted by reading the initial and final positions of the screw 44a against a scale 48 positioned adjacent the longitudinal slot 45, Fig. 6.

In order to avoid a large amplitude in the wave reflection effected in the impedance standard 13 as would occur with an abrupt transition from a section of wave guide having an air dielectric only to a section of wave guide having both a polystyrene dielectric and an air dielectric, the polystyrene blocks 22 and 23 are provided with the tapered ends 32 and 33, respectively, extending to a length of the order of six inches, and are positioned in stepped or staggered relation in the interior of the wave guide 27 substantially in nodal regions of field intensity of the electromagnetic waves being transmitted therein as shown in Fig. 3. Thus, the tapered positions 32 and 33 are displaced longitudinally in the interior of the wave guide 27 so that the tapered portion 33 lies nearer to the hybrid junction 10, Fig. 2, than does the tapered position 32. Obviously, the positions of the tapered sections 32 and 33 could be displaced 180 degrees, and the same result achieved. This tends to limit the discontinuity in wave guide 27 to a VSWR of about 1.02. By staggering the polystyrene blocks 22 and 23 in a horizontal plane, each with reference to the other in the manner above explained, such discontinuity can be substantially cancelled at any single frequency. The cancellation may be substantially effective over a wide band of operating frequencies if the original discontinuity were small. Use of tapered polystyrene blocks 22 and 23 for effecting phase shift includes the advantages: (1) an impedance discontinuity occurs at only the tapered ends 32 and 33, the opposite ends being masked by resistance card 30; (2) the discontinuity is unchanged for different phase shifts, hence the discontinuity may be cancelled as above mentioned; and (3) the mechanical arrangement is rugged.

The resistance card 30 is positioned vertically in proximity of an antinodal region of maximum field intensity of the electromagnetic waves being transmitted in wave guide 27 and terminates wave guide 27 so that for a reference setting of probe 35, the impedance standard 13 will provide at the input of the wave guide 27 an impedance equivalent substantially to the characteristic impedance of wave guide 27, and tend to reduce extraneous wave reflections from the mechanical elements rearward of the resistance card 30. The foregoing was accomplished in one instance by providing resistance card 30 with an over-all length of nine and three-quarters inches and a width of 0.870 inch (200 ohms per square I. R. C. strip material) glued on the longitudinal side of the polystyrene block 23 as above mentioned and including a taper of seven and one-quarter inches. The residual wave reflection of the resistance card 30 may be further minimized by increasing the length of the tapered end; or alternately by introducing a cancelling discontinuity on the resistance card 30 as close as possible to the back end of its tapered end.

Figs. 6 and 7 disclose an alternate arrangement for moving the polystyrene blocks 22 and 23 in place of the rods 20 and 21 and finger grip 24 associated therewith shown in Fig. 2. Referring to Fig. 6 racks 55 and 56 are rigidly attached to opposed longitudinal sides of the polystyrene blocks 22 and 23, respectively, in engagement with gears 57 and 58 mounted detachably by set screws 59, 59 projecting through integral collars of the gears 57 and 58 to a common transverse shaft 60. This shaft is rotatably mounted at its opposite ends substantially centrally at a pair of bars 61, 61 spaced in a horizontal plane and positioned longitudinally of the wave guide 27. At their left-hand ends, Figs. 6 and 7, the bars 61, 61 are rotatably mounted on a shaft 62 which is also rotatably mounted in the uppermost ends of a pair of lugs 63, 63 disposed vertically in fixed attachment to the opposite narrow sides of wave guide 27.

The right-hand end of each bar 61 is attached to one end of a coiled spring 64 whose opposite end engages a plate 65 secured transversely to the lower wide side of wave guide 27. A hand knob 66 is affixed rigidly to one end of shaft 60. The springs 64, 64 serve to maintain the gears 57 and 58 in good mechanical engagement with their associated racks 55 and 56 and to prevent back lash. When the set screws 59, 59 are disposed to secure the gears 57 and 58 rigidly to the shaft 60, the hand knob 66 is rotatable in either a clockwise or a counter-clockwise direction to move both polystyrene blocks 22 and 23 longitudinally at the interior of the wave guide 27 at the same time. In order to move either polystyrene block 22 or 23 alone, the set screw 59 associated with the respective gear 57 or 58 is loosened to permit one of these gears to rotate freely on the shaft 60. Now the freed gear is rotated by hand to slide the associated polystyrene block longitudinally of the interior of the wave guide 27. In this manner the tapered end portions 32 and 33 may be staggered as desired.

An alternative thermal resistance impedance standard 70 shown in Fig. 2 may be substituted for the polystyrene block impedance standard 13 shown to the right of the line X—X in Fig. 1 Referring to Fig. 5 a wave guide 71 includes a series transverse branch 72 having a shorting piston 73 mounted in a wide wall of wave guide 71 and provided with a calibrated scale 74 and index 74a and having a flange 75 for connection to wave guide bridge 10, Fig. 2. In the end of wave guide 71 is a shorting piston 76 having a calibrated scale 77 and index 77a. An antenna probe 78 is disposed transversely of wave guide 71, rearwardly of the branch 72 but forward of the piston 76, in a quarter wavelength supporting stub 79. This stub is mounted in a supporting tube 81 affixed to the wide wall of wave guide 71 opposite to the piston 73, but separated electrically by dielectric 82 from the stub 79. This dielectric constitutes a capacitance to by-pass R—F energy but block direct current. A thermistor bead or hot wire 83 is electrically connected to the probe 78 and the stub 79. Leads 84 and 85 connect the probe 78 and wave guide 71 to a Wheatstone bridge including fixed resistance arms 86 and 87, which are proportioned in a predetermined ratio, a calibrated decade resistance box 88 as the third arm, and the thermal resistor 83 constituting the fourth arm. A meter 89 for indicating bridge balance is connected across one bridge diagonal, and an adjustable resistor 90 and a direct current battery 91 are serially connected across the other bridge diagonal.

The thermal resistance impedance standard 70 is calibrated when disconnected from the circuit of Fig. 1 in the following manner: Two adjustable pure reactances provided by shorting pistons 73 and 76 and adjustable conductance provided by varying the direct current supplied by the battery 91 to the thermal resistor 83 are simultaneously adjusted to render the impedance looking into the input of wave guide 71 substantially a match to the characteristic impedance of wave guide 71. This match is effected at each operating frequency of the signal generator 11, Fig. 1, and the settings of the calibrated scales 74 and 77, Fig. 5, are recorded. Preferably the piston 73 is adjusted to such position that when the thermal resistor 83 is essentially short-circuited, i. e., when carrying a large amount of direct current, the first voltage minimum as indicated by a suitable standing wave detector of well-known design, not shown, is at the plane or vertical axis of probe 78. If, for example, resistance arms 86 and 87 are equal, and the direct current varied by adjustable resistor 90 until the meter 89 shows bridge balance, then the effective resistance of the thermistor bead 83 must equal the effective resistance of decade resistance 88. Therefore, known operating values for the thermal resistance 83 may be preselected by selecting known values of effective resistance in the decade 88, in each case the resistance 90 being adjusted to provide a bridge balance indication on meter 89. These reference settings of stubs 73 and 76 and matching resistance of thermal resistor 83 constitute the initial calibration of the thermal resistance impedance standard 70.

The thermal resistance impedance standard 70, Figs. 2 and 5, is now connected in the circuit of Fig. 1. Again the frequency of the signal generator 11 is adjusted to the desired operating value. The unknown impedance 12 is then connected in the circuit of Fig. 1, the pistons 73 and 76 and the thermal resistance 83 adjusted until zero reading is provided on the meter 16 in Fig. 1 in the following manner. The piston 73 is adjusted to the reference setting above mentioned, and then piston 76 and thermal resistance 83 are simultaneously adjusted to provide the zero reading on meter 16, Fig. 1. The effective resistance of the thermal resistor 83 as indicated by the setting of decade resistance 88 to give zero reading on meter 89 and the scale positions of the pistons 73 and 76 are recorded. These in conjunction with the initial calibration values can be used to compute the ratio of the resistance and reactance of the unknown impedance to the characteristic resistance of the wave guide 71 in the following equations.

Thus, $$\frac{G_x}{G_o} = \frac{R_0}{R_1}$$

$$\frac{B_x}{G_0} = \cot\frac{2\Pi Z_1}{\lambda_x'} - \cot\frac{2\Pi Z_0}{\lambda_x}$$

wherein $G_x$ = conductance of unknown impedance 12
$B_x$ = susceptance of unknown impedance 12
$G_0$ = characteristic conductance of wave guide 73
$Z_1$ = the transmission line length between the shorting stub 76 and center of antenna probe 78 with the unknown impedance 12 connected in Fig. 1
$R_1$ = resistance of thermistor bead 83 with the unknown impedance 12 connected in Fig. 1
$Z_0$ = initial transmission line length between shorting stub 76 and reference plane of antenna probe 78
$R_0$ = the initial resistance of thermistor bead 83

The unkown impedance determined in the above manner applies to a specific transverse plane in the transmission line between the unknown impedance 12 and the electrical mid-point of the wave guide bridge 10. This transverse plane and the center of the antenna probe 78 are equidistant from the electrical mid-point of wave guide bridge 10. Impedances at other specific transverse planes can be obtained from classical equations for impedance transformations along uniform transmission lines, see for example F. E. Terman, Radio Engineer's Handbook, page 179.

What is claimed is:

1. In an impedance standard comprising a hollow wave guide transmitting said microwave signals, a calibrated probe mounted on said hollow guide and adjustable to different amounts in the interior of said hollow guide substantially at an antinodal region of maximum field intensity, said probe causing wave reflection of a predetermined amplitude, solid dielectric means movable longitudinally in said hollow guide in proximity of said probe substantially in regions of decreased field intensity with reference to said probe field intensity to introduce a predetermined amount of phase shift into said wave reflection, and a resistive termination for said hollow guide movable with said dielectric means.

2. In the impedance standard according to claim 1 in which said solid dielectric means comprises a pair of elongated blocks of solid dielectric material movable so that said probe lies therebetween, said blocks having two adjacent ends nearest one of said guide branches spaced initially in staggered relation in said hollow guide, said blocks being movable together while maintaining said initially staggered relation between said adjacent ends thereof, and said termination is attached to at least one of said blocks.

3. In the impedance standard according to claim 1 in which said solid dielectric means comprises two elongated dielectric blocks having adjacent ends specially shaped to minimize wave reflection, and said termination comprises a resistance card affixed to one of said blocks and having one end specially shaped to minimize wave reflection, said one end of said card projecting in the direction of said adjacent ends of said blocks.

4. In an impedance standard therefor comprising a hollow wave guide for transmitting said microwave signals, a micrometer plunger extensible into and withdrawable from the interior of said hollow guide, a pair of elongated blocks of a solid dielectric material spaced in a horizontal plane in the interior of said hollow guide so as to include said plunger therebetween, tapered portions formed in one plane on adjacent ends of said blocks and disposed in staggered relation along an axis of said hollow guide, a resistance card affixed to one of said blocks and having a tapered end disposed in the same direction as said tapered portions, said tapered portions, probe and resistance card being disposed in sequence with reference to one end of said hollow guide, and means at the opposite end of said hollow guide for moving each of said blocks relative to the other as well as both of said blocks at the same time longitudinally of the interior of said hollow guide.

5. In a system transmitting signals in the microwave range and including an initial reflection of such signals, an impedance standard for substantially cancelling said initial reflection, comprising a section of wave guide transmitting said signals and said initial reflection, a probe fixedly mounted on said guide in regard to longitudinal adjustment but provided with vertically adjustable coupling to one area in the interior of said guide to introduce therein a further reflection having a controllable amplitude, and means for shifting the phase of said further reflection, said means being adjustable in the interior of said guide in an area which is different from said one area and which is spaced therefrom in a direction normal to a longitudinal axis of said guide, said different area being positioned between an input end of said guide and said probe, said adjustments of said probe and phase shifting means establishing said further reflection with such amplitude and phase as to effect substantially the cancellation of said initial reflection.

6. The system according to claim 5 in which said probe is mounted in said one area which is substantially coincident with a plane of a longitudinal axis of said guide, said probe is mounted between a terminating end of said guide and said phase shifting means, said probe provides such vertically adjustable coupling to said one area as to introduce into said guide said further reflection with an amplitude approximately equal to an amplitude of said initial reflection.

7. The system according to claim 5 in which said phase shifting means comprises a solid dielectric adjustable longitudinally of said guide in said different area between said input end of said guide and said probe.

8. The system according to claim 5 in which said probe is mounted on a longitudinal axis of said guide in said one area which is located between a terminating end of said guide and said phase shifting means, and said phase shifting means comprises a solid dielectric adjustable longitudinally in said guide in said different area which is located between said input end of said guide and said probe.

9. The microwave system according to claim 6 in which a resistive termination is attached to said phase-shifting means and is actuable therewith by said actuating means.

10. In a transmission system for microwave signals, a wave guide transmitting said signals, said guide also transmitting initial reflections of said signals, means adjustable only in a vertical direction in one area of the interior of said guide for setting up additional signal reflections of controllable amplitude, and means adjustable in another area of the interior of said guide for shifting the phase of said additional reflections, said first-mentioned means in said one area being spaced from said second-mentioned means in said other area in a direction normal to a longitudinal axis of said guide, said phase shifting means comprising two elongated blocks of dielectric material spaced from each other, ends of said blocks facing the input terminal of said guide being specially shaped to minimize a tendency of said ends to cause signal reflections, one of said ends being displaced from the other in a longitudinal direction in said guide to minimize further the tendency of said ends to cause signal reflections, said ends being movable as a unit longitudinally of said guide in said other area to shift the phase of said additional reflections, both said means cooperating in their adjustments to provide said additional reflections with such amplitude and phase as to cancel substantially said initial reflections.

11. The system according to claim 10 in which one end of each of said blocks is provided with a tapered portion disposed in a vertical plane, one tapered end portion is displaced from the other in a longitudinal direction in said guide, and said tapered end portions are positioned in said other area in a direction diverging from said one area toward the input terminal of said guide, said tapered end portions are movable as a unit relative to the input terminal of said guide.

References Cited in the file of this patent

UNITED STATES PATENTS

| Number | Name | Date |
|---|---|---|
| 1,665,397 | Wunsch | Apr. 10, 1928 |
| 1,832,969 | Edwards | Nov. 24, 1931 |
| 2,403,289 | Korman | July 2, 1946 |
| 2,407,267 | Ginzton | Sept. 10, 1946 |
| 2,419,613 | Webber | Apr. 29, 1947 |
| 2,427,098 | Keizer | Sept. 9, 1947 |
| 2,427,100 | Kihn | Sept. 9, 1947 |
| 2,433,368 | Johnson | Dec. 30, 1947 |
| 2,449,182 | Sontheimer | Sept. 14, 1948 |
| 2,451,732 | Hershberger | Oct. 19, 1948 |
| 2,454,530 | Tiley | Nov. 23, 1948 |
| 2,546,840 | Tyrrell | Mar. 27, 1951 |
| 2,567,210 | Hupcey | Sept. 11, 1951 |